United States Patent [19]

Teller et al.

[11] 3,907,787
[45] Sept. 23, 1975

[54] 7-(2-THIOXO-4-THIAZOLIDINECARBOXAMIDO)CEPHALOSPORANIC ACIDS AND THE CORRESPONDING S-ETHERS

[75] Inventors: Daniel M. Teller, Devon; John H. Sellstedt, Pottstown, both of Pa.

[73] Assignee: American Home Products Corporation, New York, N.Y.

[22] Filed: Feb. 22, 1974

[21] Appl. No.: 444,944

[52] U.S. Cl................ 260/243 C; 424/246
[51] Int. Cl.²......................... C07D 501/20
[58] Field of Search................ 260/243 C

[56] References Cited
UNITED STATES PATENTS

| | | | |
|---|---|---|---|
| 3,813,385 | 5/1974 | Henniger et al. | 260/243 C |
| 3,840,556 | 10/1974 | Kukolja | 260/243 C |
| 3,842,077 | 10/1974 | Henniger et al. | 260/243 C |

*Primary Examiner*—Nicholas S. Rizzo
*Attorney, Agent, or Firm*—Richard K. Jackson

[57] ABSTRACT

The antibacterial agents of the invention present the formula:

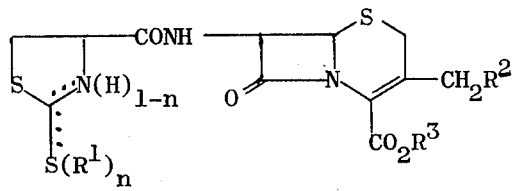

wherein
$R^1$ is hydrogen or alkyl of 1 to 4 carbon atoms;
$R^2$ is —H, $CH_3CO_2$—,

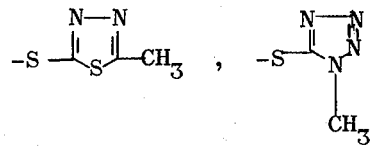

or when taken with the 3-carboxyl group,

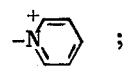

;

$R^3$ is —H, an alkali metal or —$NH_4$; and
$n$ is 0 or 1.

3 Claims, No Drawings

7-(2-THIOXO-4-THIAZOLIDINECARBOXAMIDO)CEPHALOSPORANIC ACIDS AND THE CORRESPONDING S-ETHERS

DESCRIPTION OF THE INVENTION

In accordance with this invention there is provided chemical compounds of the formula:

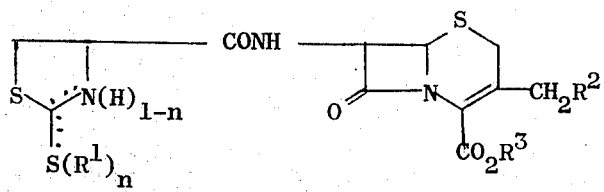

$R^1$ is hydrogen or alkyl or 1 to 4 carbon atoms;
$R^2$ is —H, $CH_3CO_2$—,

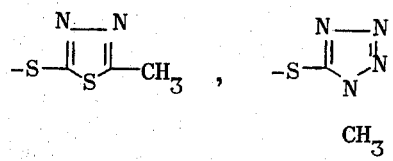

or when taken with the 3-carboxyl group,

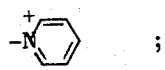

$R^3$ is —H, an alkali metal or —$NH_4$;
n is 0 or 1; and
the dotted lines represent the presence of a double bond to form the thiazole and thiazolidine heterocyclic ring structure depending upon the value of n. A preferred group of compounds from the standpoint of ease of production of the starting materials and the final products are those of the formula:

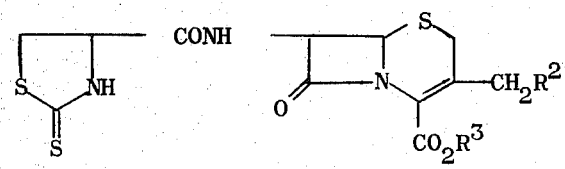

wherein
$R^2$ is —H, $CH_3CO_2$— or

and $R^3$ is —H, —Na, —K or $NH_4$.

The compounds of this invention are prepared by reacting the compounds

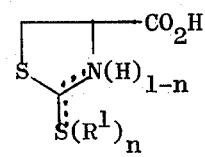

with the appropriate 7-amino cephalosporin derivative in the presence of a condensing agent such as carbonyl diimidazole, dicyclohexylcarbodiimide alone or in the presence of N-hydroxysuccinimide or 1-hydroxybenzotriazole, isobutylchloroformate, and the like. Other applicable condensing agents are disclosed by Spencer et al., J. Med. Chem., 9, pp. 746–750 (1966), Micetich et al., J. Med. Chem., 15, pp. 333–335 (1972); Klausner et al., Synthesis. pp. 453–463 (1972) and U.S. Pat. No. 3,338,896.

Alternatively, the precursor carboxylic acid may be converted to an acid halide by known means and used in aqueous medium to acylate the free 7-amino group of either an alkali metal salt or ammonium salt of the desired cephalosporanic acid reactant. Likewise, the acid halide may be used to acylate, in organic solution, either a tertiary amine salt or a silylated, phosphorylated or saccharinated derivative of the 7-amino cephalosporin derivative.

The precursor thiazole and thiazolidine carboxylic acids were prepared by the following methods:

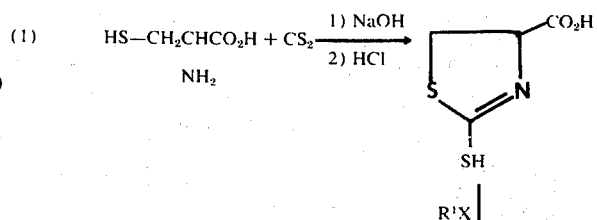

the first step of the reaction following the procedure of U.S. Pat. No. 3,697,516;

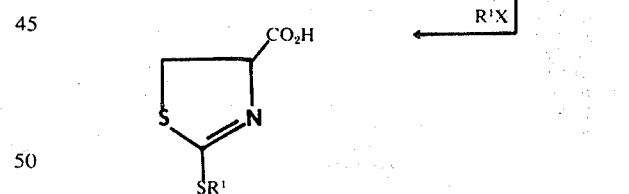

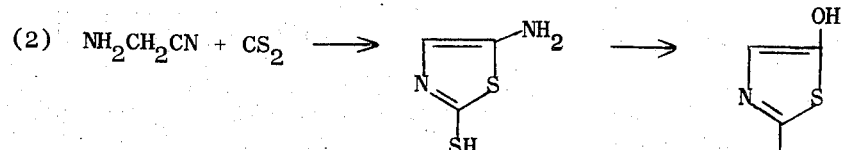

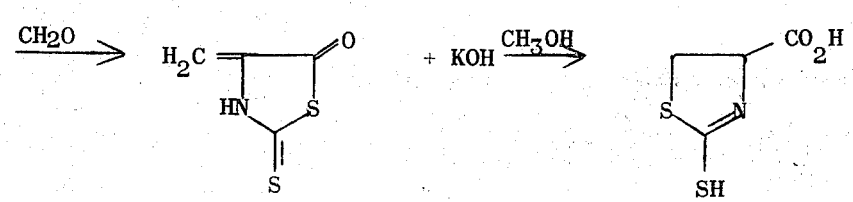

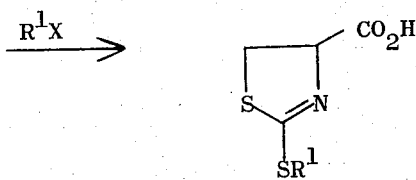

where the alkyl halide $R^1X$ is I—, Br— or Cl—.

The reaction sequence being that disclosed by Doyle et al., J. Chem. Soc. (London), pp. 4605–4614 (1958) and Cook et al., J. Chem. Soc. (London), pp. 201–206 (1948).

The compounds of this invention have been found to be active antibacterials effective against gram-positive and gram-negative test organisms as well as penicillin resistant staphlococcus by using the well known and scientificially accepted agar serial dilution testing technique. Thus, the compounds of the invention are useful in the fields of comparative pharmacology and in microbiology and may be used for the treatment of infections amenable to treatment with cephalosporin antibiotics.

The following examples illustrate the preparation of the cephalosporin derivatives of this invention, employing 2-thioxo-4-thiazolidinecarboxylic acid as representative of the group of acyl reactants disclosed above and 7-aminocephalosporanic acid as representative of the otherwise known 7-aminocephalosporin reactants embraced by the structural formula presented, supra. The activitiy of the products of the examples is presented for those specific bacterial strains against which the compound exemplified was active at or below 250 micrograms per milliliter. The representative nature of the bacterial strains employed to demonstrate antibacterial activity are indicative of the broader applicability of the compounds of this invention in the control of bacterial infestations other than those specifically referred to in each of the following examples. The bacteria are named followed by the specific strain and the concentration in micrograms per milliliter at which 100 percent inhibition occurred. The abbreviations for each bacterium are:

| | |
|---|---|
| Ba Su | *Bacillus subtilis* |
| St Au | *Staphylococcus aureus* |
| Ne Ca | *Neisseria catarrhalis* |
| Es Co | *Escherichia coli* |
| Es In | *Escherichia intermedia* |
| Sa Pa | *Salmonella paratyphi* |
| Sa Ty | *Salmonella typhosa* |
| Kl Pn | *Klebsiella pneumoniae* |
| Bo Br | *Bordetella bronchiseptica* |
| Pr Vu | *Proteus vulgaris* |
| St Py | *Staphylococcus pyrogenes* |
| Pr My | *Proteus myrablis* |
| He Sp | *Herellea species* |

The in vivo data was obtained by injecting mice (male, 16–18 grams MBR strain) intraperitoneally with 0.5 milliliters of a suspension of the infective agent in 5 percent gastric mucin. The animals were randomized and treated with the cephalosporin derivative subcutaneously from 0.5 to 1 hour after randomization. A second dose was administered 6 hours later. Twenty-four hours post-infection, all surviving animals received a final dose of the compound being tested. In each trial, injected controls amounted to at least 10 percent of the infected pooled mice. All the animals were observed for a period of 14 days and the $CD_{50}$ (curative dose) values were determined by the method of Reed and Muench (1958).

EXAMPLE 1

7-(2-Thioxo-4-thiazolidinecarboxamido)cephalosporanic acid.

To a solution of 2-thioxo-4-thiazolidinecarboxylic acid (0.82 g, 0.0050 moles) in dry dimethylformamide (10 milliliters) at room temperature is added carbonyldiimidazole (0.82 g. 0.0050 moles) under nitrogen. Carbon dioxide evolution begins immediately with formation of a precipitate. After 30 minutes at room temperature, the residual carbon dioxide is removed under vacuum. The mixture is cooled to about 10°C. and a solution of 7-aminocephalosporanic acid (1.36 grams, 0.005 moles) in dry methylene chloride (20 milliliters) containing triethylamine (2.08 milliliters) is added all at once. After stirring 2 hours at room temperature, the mixture is concentrated at < 40°C. in vacuo. n-Butanol (5.0 milliliters) is added, then potassium ethyl hexanoate (2.50 milliliters of 2 Molar solution in n-butanol). After stirring 10 minutes, diethyl ether (100 milliliters) is added and the product filtered, 2.50 grams of yellow solid; m.p. 120°–147°C. (decomposition). The product is purified by dissolving in water (400 milliliters), washing twice with ethyl acetate (75 milliliters), adding ethyl acetate (400 milliliters) and acidifying the mixture of pH = 2.2 with concentrated hydrochloric acid. The mixture is shaken thoroughly, the organic layer separated, washed twice with brine, dried over anhydrous sodium sulfate and stripped in vacuo < 40°C. The residue is triturated with diethyl ether to give the product, 0.70 gram; m.p. 100°–110°C. (decomposition) $\lambda max^{KBr}$ 5.60, 5.78, 5.85 (shoulder), 5.90 $\mu$ (shoulder); NMR has 2.05 ppm peak.

Elemental Analysis for: $C_{14}H_{15}N_3O_6S_3$.
Calc'd: C, 40.29; H, 3.63; N, 10.07; S, 23.04.
Found: C, 40.69; H, 4.22; N, 8.67; S, 25.09.

| | | |
|---|---|---|
| Ba Su | 6633 | 0.122 |
| St Au | 6538P | 0.488 |
| St Au | Smith | 0.488 |
| St Au | CHP | 1.95 |
| St Au | 53–180 | 0.976 |
| Ne Ca | 8193 | 31.3 |
| Es Co | 9637 | 15.6 |
| Es In | 65–1 | 250 |
| Sa Pa | 11737 | 7.81 |
| Kl Pn | 10031 | 7.81 |
| Bo Br | 4617 | 62.5 |
| Pr Vu | 6896 | 15.6 |

The in vivo data is as follows:

| Organism | Strain | Curative Dose 50 in milligrams per mouse |
|---|---|---|
| St Py | C203 | 1.13; 1.19 |
| Pr My | PR3 | 2.68; 4.9 |
| Sa Ty | SAD12 | 7.2 |

EXAMPLE II

The process of the preceding example was repeated employing five times as much of the reactants, to obtain 4.7 grams of yellow solid, m.p. 110°–140°C. (decomposition) with an identical infra red and NMR spectrum and Elemental Analysis for: $C_{14}H_{15}N_3O_6S_3$.
Calc'd: C, 40.29; H, 3.63; N, 10.07; S, 23.04.
Found: C, 40.51; H, 4.09; N, 9.86; S, 23.13.

| | | |
|---|---|---|
| Ba Su | 6633 | 0.122 |
| St Au | 6538P | 0.488 |
| St Au | SMITH | 0.488 |
| St Au | CHP | 1.95 |
| St Au | 53–180 | 1.95 |
| Es Co | 9637 | 3.90 |
| Sa Pa | 11737 | 3.90 |
| Kl Pn | 10031 | 3.90 |
| Pr Vu | 6896 | 125 |
| Es In | 65–1 | 250 |
| He Sp | 9955 | 250 |
| Ne Ca | 8193 | 62.5 |
| Bo Br | 4617 | 62.5 |

What is claimed is:

1. A compound of the formula:

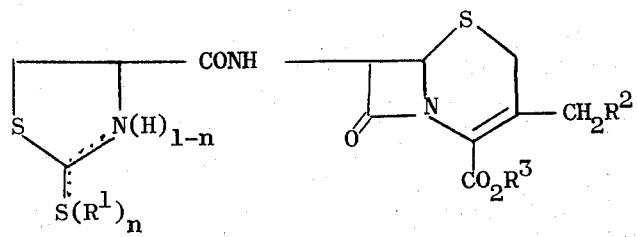

in which
  $R^1$ is hydrogen or alkyl of 1 to 4 carbon atoms;
  $R^2$ is hydrogen, acetoxy or N-pyridinium
  $R^3$ is hydrogen, an alkali metal or the ammonium ion; and
  $n$ is 0 or 1.

2. A compound of claim 1 of the formula:

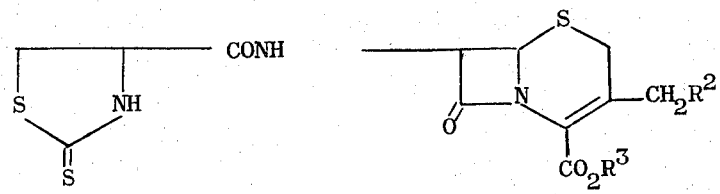

wherein
  $R^2$ is hydrogen, acetoxy or N-pyridinium; and
  $R^3$ is hydrogen, sodium, potassium or the ammonium ion.

3. The compound of claim 1 which is 7-(2-thioxo-4-thiazolidine-carboxamido)cephalosporanic acid.

* * * * *